(12) United States Patent
Schell et al.

(10) Patent No.: US 7,843,661 B2
(45) Date of Patent: Nov. 30, 2010

(54) CONTROLLER WITH FRACTIONAL POSITION ALGORITHM

(75) Inventors: David Louis Schell, Fort Collins, CO (US); Chris T. Settje, Westminster, CO (US); Thomas Zirps, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1244 days.

(21) Appl. No.: 11/210,597

(22) Filed: Aug. 24, 2005

(65) Prior Publication Data

US 2007/0053098 A1     Mar. 8, 2007

(51) Int. Cl.
    *G11B 5/596*     (2006.01)
(52) U.S. Cl. .................................. 360/77.08
(58) Field of Classification Search .................. None
See application file for complete search history.

(56) References Cited

U.S. PATENT DOCUMENTS

| | | | |
|---|---|---|---|
| 5,587,850 A | 12/1996 | Ton-that | |
| 5,721,648 A | 2/1998 | Phan et al. | |
| 5,796,543 A | 8/1998 | Ton-That | |
| 5,798,883 A * | 8/1998 | Kim | 360/31 |
| 5,805,368 A * | 9/1998 | Hishikawa | 360/51 |
| 5,920,440 A | 7/1999 | Bang | |
| 6,002,541 A | 12/1999 | Belser et al. | |
| 6,091,567 A | 7/2000 | Cooper et al. | |
| 6,122,133 A | 9/2000 | Nazarian et al. | |
| 6,141,175 A | 10/2000 | Nazarian et al. | |
| 6,172,836 B1 | 1/2001 | Bang | |
| 6,304,398 B1 | 10/2001 | Gaub et al. | |
| 6,310,742 B1 | 10/2001 | Narian et al. | |
| 6,614,609 B1 | 9/2003 | Reed et al. | |
| 6,614,618 B1 | 9/2003 | Sheh et al. | |
| 6,768,606 B2 | 7/2004 | Helms | |
| 6,775,081 B2 * | 8/2004 | Ottesen et al. | 360/48 |
| 6,831,808 B2 | 12/2004 | Ottesen et al. | |
| 6,882,486 B1 | 4/2005 | Kupferman | |
| 6,898,665 B1 | 5/2005 | Megiddo | |

\* cited by examiner

*Primary Examiner*—Daniell L. Negrón
(74) *Attorney, Agent, or Firm*—Theodore M. Magee; Westman, Champlin & Kelly, P.A.

(57) ABSTRACT

One illustrative embodiment of the present invention pertains to a device. The device is configured to evaluate a Gray code value and to provide compensation for error in the Gray code value. Another illustrative embodiment of the present invention pertains to a method. The method includes comparing Gray code information with servo information. The method also includes evaluating error in the Gray code information based on the comparison between the Gray code information with servo information. Another illustrative embodiment of the present invention pertains to a data storage system. The data storage system includes a data storage medium, a head, and a controller. The head is controllably positionable relative to the data storage medium. The controller includes a means for sensing position information from the head. The controller also includes a means for compensating for error in the position information, to position the head relative to the data storage medium. Embodiments of the present invention provide unforeseen and inventive advantages over conventional data storage systems, including by assuring superior position evaluation and control of a read head relative to a data storage medium.

20 Claims, 3 Drawing Sheets

CONTROLLER WITH FRACTIONAL POSITION ALGORITHM

FIELD OF THE INVENTION

The present invention relates generally to data storage systems, and in particular to a controller with a fractional position algorithm.

BACKGROUND OF THE INVENTION

Data storage systems have tended to be made ever smaller, yet with ever greater storage capacity, as technology has advanced. Such data storage systems are usefully applied in a wide variety of settings including computers, networks, digital music players, PDAs, digital still cameras and video cameras, and external computer memory, among a wide variety of other possible examples. One limit on the performance of a data storage system is the accuracy with which the system can evaluate and control the position of a read/write head or other form of read head relative to the positions of data within the system. Providing data storage technology with optimum performance in current applications poses considerable technical challenges. However, there remains a persistent need for providing data storage systems that are ever smaller, yet with ever greater storage capacity and superior performance characteristics.

SUMMARY OF THE INVENTION

Embodiments of the present invention provide unforeseen and inventive advantages over conventional data storage systems, including by assuring superior control of a read/write head, or other form of read head, relative to a data storage medium, as an illustrative example.

One illustrative embodiment of the present invention pertains to a device. The device is configured to evaluate a Gray code value and to provide compensation for error in the Gray code value.

Another illustrative embodiment of the present invention pertains to a method. The method includes comparing Gray code information with servo information. The method also includes evaluating error in the Gray code information based on the comparison between the Gray code information with servo information.

Another illustrative embodiment of the present invention pertains to a data storage system. The data storage system includes a data storage medium, a head, and a controller. The head is controllably positionable relative to the data storage medium. The controller includes a means for sensing position information from the head. The controller also includes a means for compensating for error in the position information, to position the head relative to the data storage medium.

Other features and benefits that characterize various embodiments of the present invention will be apparent to those skilled in the relevant art from the description herein and the associated drawings.

DETAILED DESCRIPTION OF ILLUSTRATIVE EMBODIMENTS

Figure 1:
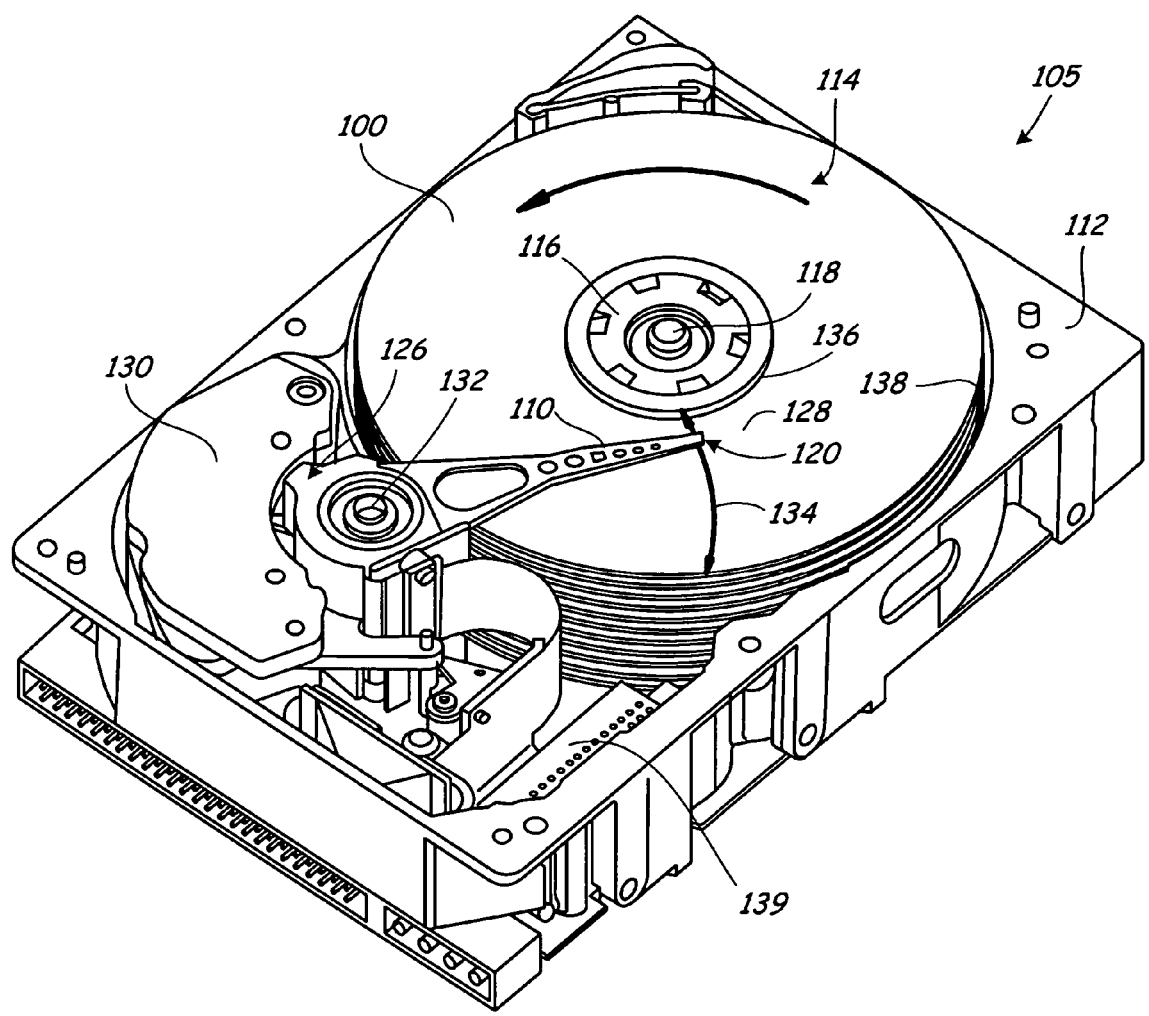
FIG. 1 is a perspective view of a data storage system, according to one illustrative embodiment.

Embodiments of the present invention provide unforeseen and inventive advantages over conventional data storage systems, including by assuring superior control of a read/write head, or other form of read head, relative to a data storage medium, as an illustrative example. For example, such superior control may be provided by a controller or other device that is configured to receive position information from a read head and to use the position information to evaluate a track offset position of the read head, including by compensating for any error in a Gray code comprised in the position information. Such a controller or other device may be incorporated in a data storage system. Some illustrative embodiments are described herein. Although the examples below show more than enough detail to allow those skilled in the art to practice the present invention, subject matter regarded as the invention is broader than any single example below.

To avoid needless distractions from the essence of the present invention, like-numbered reference numerals appearing in a later figure generally refer to the same elements as those in an earlier figure. Also, numerous aspects of basic engineering and of positioning technologies that are not a part of the present invention (or are well known in the art) are omitted for brevity. For example, this document does not articulate detailed and diverse methods for writing a servo sector. Neither does it include implementation decisions such as what the bit density will be on each track. Specific techniques for constructing disc stacks are likewise omitted, typically being a matter of design choice to those of ordinary skill in that field of technology.

FIG. 1 depicts data storage system 105, which may incorporate a controller or other device with a fractional position algorithm, according to one illustrative embodiment. FIG. 1 depicts is an exploded, perspective view of a data storage system 205, illustratively embodied as a disc drive in this embodiment, which includes disc 100, according to an illustrative embodiment.

Disc drive 105 is one example from a variety of data storage systems to which various embodiments are applicable. Disc drive 105 includes a housing with a deck 112 and a top cover (not shown). Disc drive 105 also includes a disc pack 114 comprising representative disc 100 and several other, similar discs. Disc pack 114 is rotatably mounted on deck 112 on a spindle motor (not shown) by a disc clamp 116. Disc pack 114 includes a plurality of individual discs which are mounted for co-rotation about central axis 118. Each disc surface has an associated slider, such as representative slider 120, which is mounted to disc drive 105 and carries a data interface head such as a read/write head or other form of read head (not separately shown), with read and/or write function, on slider 120 for communication with the respective disc surface, such as representative disc surface 128, in this illustrative embodiment. The read/write head on head-bearing slider 120 is capable of reading data from and writing data to disc surface 128, in this illustrative embodiment. The data is generally written along a series of concentric or spiral data tracks written on media surface 128, for example. The read/write heads may be of any type known in the art or yet to be developed, including magnetic, magnetoresistive, giant magnetoresistive (GMR), optical, and so forth, in various embodiments. In different embodiments, a wide variety of numbers of discs, read/write heads, and head-bearing sliders, may occur.

In FIG. 1, representative slider 120 is supported by suspension 110 which is rotatably mounted on deck 112. More particularly, suspension 110 is rotatably mounted on actuator 126, included on deck 112, and is thereby disposed on deck 112 in a controllably moveable way. Suspension 110 supplies a pre-load force to slider 120 which is substantially normal to opposing disc surface 128. The pre-load force counteracts an aerodynamic lifting force developed between slider 120 and disc surface 128 during the rotation of disc pack 114. Each disc surface is likewise interfaced by a similarly disposed slider (not shown). Actuator 126 is a rotary moving coil actuator and includes a voice coil motor, shown generally at 130, in this illustrative embodiment. Voice coil motor 130 rotates actuator 126 about pivot shaft 132 to position slider 120 over an intended data track (not shown in FIG. 1) along a slider range 134 between a disc inner diameter 136 and a disc outer diameter 138. Other elements may occur in alternative embodiments, such as an actuator that positions the read/write head through linear extension and retraction, for example.

Voice coil motor 130 operates under control of internal circuitry 139. Internal circuitry 139 may include software or firmware for controlling the operation of data storage system 105, for example. Such software or firmware may include computer-executable instructions included on a computer-readable medium, along with a processor configured to execute those instructions. The computer-executable instructions may also configure the processor to perform further tasks, such as receive position information, produce evaluated values based on that information such as a predicted position of a read head, and send control instructions based on those evaluated values, for example. Internal circuitry 139 may be considered a controller, or alternatively a part of a controller together with other elements of data storage system 105, for the operation of the sliders including representative slider 120, along with the read/write heads associated with the sliders. Internal circuitry 139 may therefore include algorithms for reading and writing data from and to the media surfaces such as representative media surface 128, and for functions involved in supporting such reading and writing of data, such as controllably positioning the read/write heads relative to the media surfaces, and relative to tracks on the media surfaces, in an illustrative embodiment.

Figure 2:
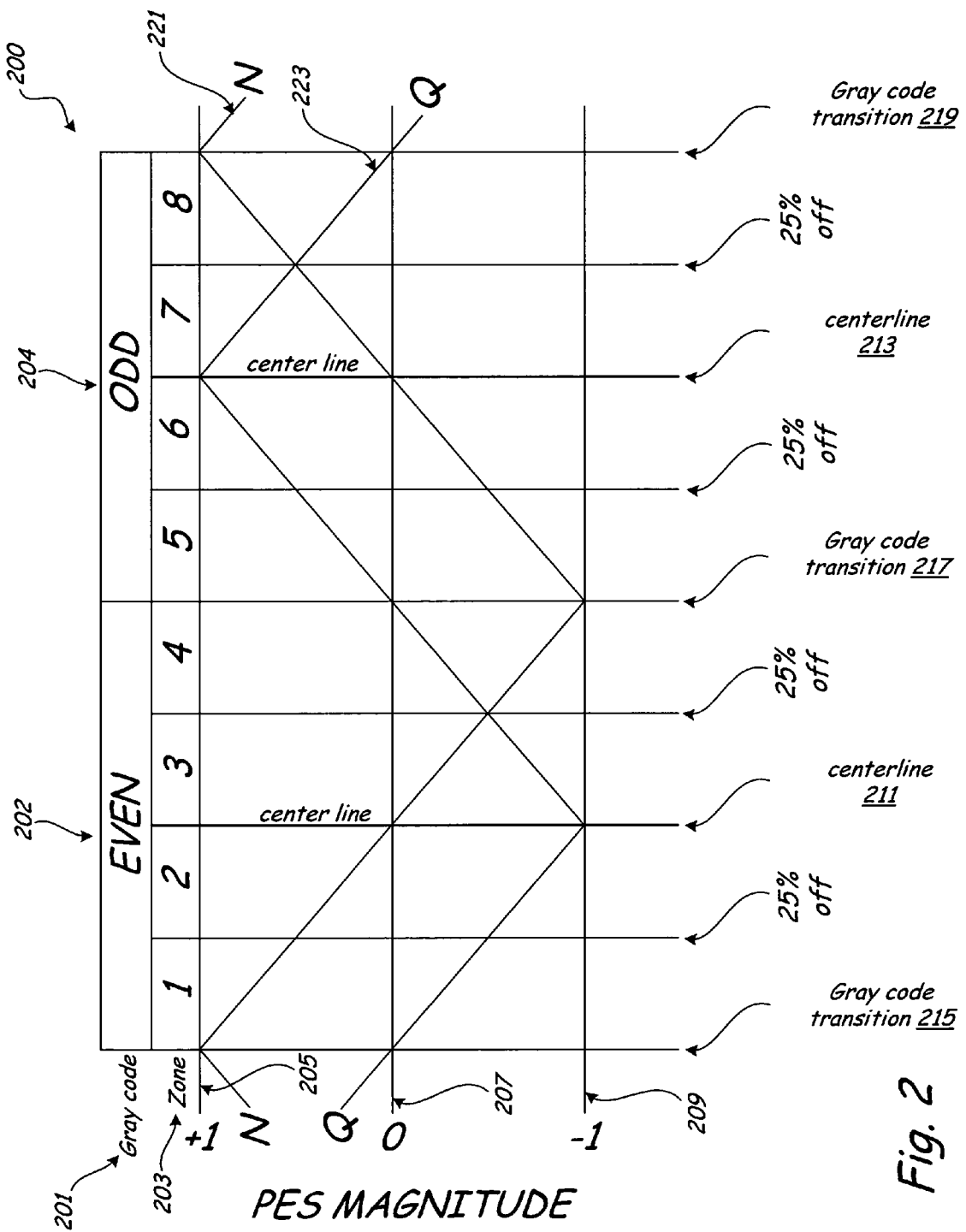
FIG. 2 is a schematic of a representative section of a data storage medium, according to an illustrative embodiment.

FIG. 2 depicts a schematic of a representative small portion 200 of a media surface, such as media surface 128, that includes a radially repeating servo burst pattern, as will be well understood by those who are skilled in the relevant art. Media surface portion 200 includes track centerlines 211 and 213. These are representative of concentric or spiral tracks disposed on media surface 128, that are largely available for the storage of user data, and also include operating information such as servo and Gray code information, for example. In this view, the center of the media surface, which may coincide with its center of rotation within a data storage system, lies off to one side in a direction perpendicular to track centerlines 211 and 213. A media surface typically contains a great many of these tracks. For example, in one illustrative embodiment, a media surface may include in the neighborhood of 100,000 tracks per inch, and may for example have a diameter of 3.5 inches, 2.5 inches, 1 inch, or a fraction of an inch. Many other track densities and media surface sizes, both higher and lower than these examples, may occur in various embodiments.

Media surface portion 200 includes Gray code sector 201, zone sector 203, and a position error signal (PES) sector bounded by PES boundary 205 and PES boundary 209. Gray code sector 201 and PES sector 205-209 contribute to position information that is read by a read/write head or another type of read head, and used to evaluate a track offset position of the read head—that is, a position by which the head is offset from a track centerline such as centerlines 211, 213. This track offset position is useful, for instance, for guiding the head back toward the desired track centerline, or otherwise compensating for the head's performance issues from being away from the track centerline, for example.

PES sector 205-209 includes servo burst information including servo burst component N, indicated with function 221, and servo burst component Q, indicated with function 223. N and Q are two servo burst components, incorporating servo burst amplitude values such as might be measured by a read head, and useful for deriving a position error signal (PES). In this illustrative embodiment, the absolute value of Q reaches its maxima at the centerlines 211, 213 of the tracks, while the absolute value of N reaches its maxima at the Gray code transitions 215, 217, 219 halfway between each pair of adjacent track centerlines. A number of different mechanisms for deploying the N and Q components may occur in different embodiments. For example, in one illustrative embodiment, N and Q are the superimposed sums of four servo bursts A, B, C and D, such that N=A-B and Q=C-D, where A and B alternate with each other, and C and D alternate with each other, while the A/B cycle is offset by half a servo burst from the C/D cycle. This is one of several examples that are known or possible that may be used to generate an N and Q pattern such as illustratively depicted in FIG. 2.

A data storage system may use a fractional position algorithm that uses position information, such as Gray code, N and Q values, as input to generate a PES and/or to evaluate a track offset position of the read head, for example. Some earlier systems used a fractional position algorithm that could handle an indeterminate Gray code bit within plus or minus 25% of the Gray code transition, as seen for example in FIG. 2 with the "25% off" lines at each halfway mark between representative centerlines 211, 213 and representative Gray code transitions 215, 217 and 219. It was found in such systems that an indeterminate Gray code least significant bit was exceeding the plus or minus 25% limit of the fractional position algorithm. This sometimes caused a "spike" in the PES, which involved a one sample position error excursion outside a write fault threshold, which would disable the write function to prevent writing onto an incorrect position. It was also found, as a larger concern, that the excessive indeterminate Gray code bit was sometimes not causing a position error signal outside the write fault threshold, and thereby allowing an apparently valid but actually incorrect evaluation of head position, which would allow the head to write onto the media surface even though it was at an incorrect position. This erroneous behavior is resolved in embodiments disclosed herein, which can compensate for an indeterminate Gray code bit occurring within plus or minus 50% of a Gray code transition—in other words, right up to the track centerlines (e.g. 211, 213), and therefore anywhere on the media surface. Illustrative embodiments disclosed herein are therefore configured to evaluate a track offset position of the read head, including by compensating for any error in a Gray code comprised in the position information, no matter where the Gray code occurs relative to the track centerlines (e.g. 211, 213) and the Gray code transitions (e.g. 215, 217, 219).

Figure 3:
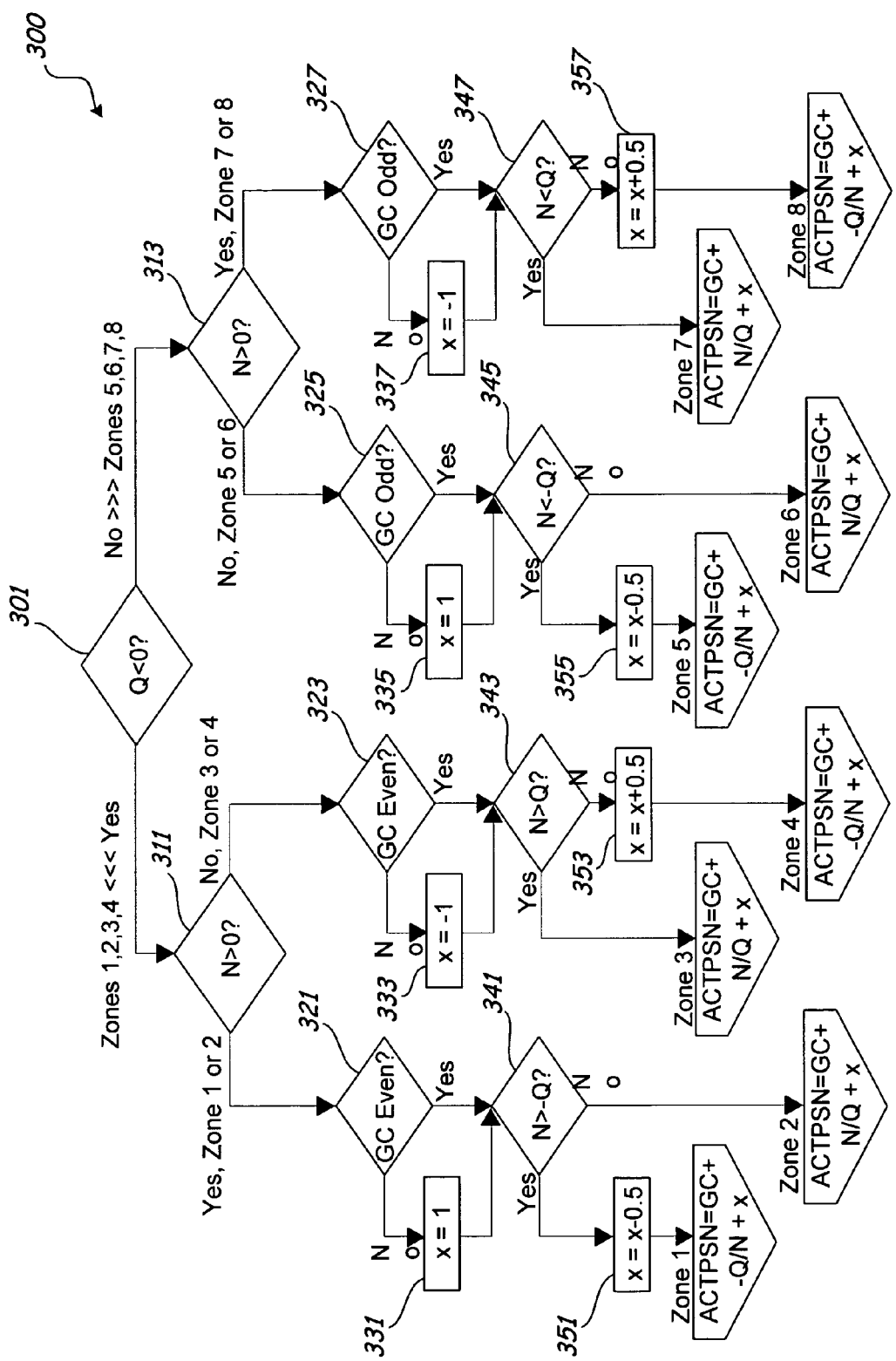
FIG. 3 is a flowchart diagram of a fractional position algorithm for a controller of a data storage system, according to an illustrative embodiment.

FIG. 3 is a flowchart diagram of a fractional position algorithm 300 for a controller of a data storage system, according to an illustrative embodiment. Fractional position algorithm 300 is an illustrative embodiment of an algorithm configured to receive position information, including a value for N, a value for Q, and a Gray code value, and to predict a position of a read head as a function of the position information. Algorithm 300 evaluates the values of N and Q prior to evaluating the Gray code value. Fractional position algorithm 300 may consist of computer-executable instructions included in a computer-readable medium such as internal circuitry 139, for example, which can be executed by a processor, also included in internal circuitry 139, that controls data storage system 105, to configure the processor to perform functions such as receive the position information that serves as input for the algorithm, and to use the output of the algorithm to predict a position of a read head as a function of the position information, in one illustrative embodiment.

As seen in FIG. 3, the algorithm 300 first performs step 301 to evaluate whether the received Q value is less than zero. If yes, it proceeds to step 311; if no, it proceeds to step 313. Next, algorithm 300 performs either step 311 or step 313, both of which are to evaluate whether the received N value is greater than zero. From step 311, if yes, then it proceeds to step 321, and if no, it proceeds to step 323. From step 313, if yes, then it proceeds to step 327, and if no, it proceeds to step 325. As the third step, regardless of which of the four paths algorithm 300 has followed by now, it next evaluates whether the Gray code value is even or odd. Specifically, if proceeding from step 321 or step 323, algorithm 300 evaluates whether the Gray code value is even, and if proceeding from step 327 or step 325, algorithm 300 evaluates whether the Gray code value is odd. Algorithm 300 evaluates the Gray code value in these specific forms because the expected answer in each case is yes, assuming the Gray code value is correct for the position corresponding to the evaluated values of Q and N. As can be seen with reference again to FIG. 2, for step 321 to be reached and therefore for the Q line 223 to be less than zero and the N line 221 to be greater than zero, the position should be in zones 1 or 2, and the Gray code value should be even. For step 323, i.e. Q less than zero and N less than zero, the position should be in zones 3 or 4, and the Gray code value should be even. For step 325, i.e. Q greater than zero and N less than zero, the position should be in zones 5 or 6, and the Gray code value should be odd. For step 327, i.e. Q greater than zero and N greater than zero, the position should be in zones 7 or 8, and the Gray code value should be odd.

Therefore, at steps 321, 323, 325, and 327, the expected answer is yes, and an answer of no indicates an error in the Gray code value, such that the Gray code least significant bit does not match with the zone indicated from the Q and N values. Accordingly, for each of steps 321, 323, 325, and 327, if a yes answer is received, it proceeds to the next evaluation step, i.e. steps 341, 343, 345, or 347, respectively; but if a no answer is received, algorithm 300 detours first to a position compensation step, i.e. steps 331, 333, 335, or 337, respectively. Steps 331, 333, 335, or 337 introduce a correction factor x of either +1 or −1 that will be used to compensate for the error in the Gray code value, in evaluating the track offset position of the read/write head or other form of read head. Then, whether or not the appropriate one of steps 331, 333, 335, or 337 has been triggered, algorithm 300 proceeds to the appropriate next evaluation step, i.e. step 341, 343, 345, or 347, respectively.

Steps 341, 343, 345, and 347 are intended to finish the task of evaluating which of the eight zones depicted in FIG. 2 corresponds to the track offset position of the read head, such as a read/write head in some embodiments. The specific evaluation performed depends on which step is performed. Step 341, which is performed if the Q value is less than zero and the N value is greater than zero, involves evaluating whether the N value is greater than negative one times the Q value. Step 343, which is performed if the Q value is less than zero and the N value is not greater than zero, involves evaluating whether the N value is greater than the Q value. Step 345, which is performed if the Q value is not less than zero and the N value is not greater than zero, involves evaluating whether the N value is less than negative one times the Q value. And step 347, which is performed if the Q value is not less than zero and the N value is greater than zero, involves evaluating whether the N value is less than the Q value. These are all specific to determining which particular one of the eight zones corresponds to the fractional track offset position of the read head, depending on the information already gained. Each one is sufficient to distinguish between which of the two remaining possible zones corresponds to the Q and N values already evaluated. Steps 341 and 345 also lead to an additional compensation step, i.e. steps 351 or 355, respectively, if the evaluation results in a yes answer, while steps 343 and 347 also lead to an additional compensation step, i.e. steps 353 or 357, respectively, if the evaluation results in a no answer. These additional compensation steps correspond to an evaluated position that is within plus or minus 25% of one of the Gray code transitions (e.g. 215, 217, 219), and they further modify the correction factor x by either +0.5 or −0.5.

In those cases where the Gray code least significant bit does not match, in the zones that are more than 25% of the way from a Gray code transition—i.e. zones 2, 3, 6 and 7—the final result of the algorithm includes a value for x that is equal to 1 or −1, which will indicate a clear error in the position signal. If an incorrect adjustment is made to the output, a large position error signal will be generated, triggering the generation of a substitute value. This system therefore ensures that an erroneous Gray code least significant bit will always cause a position error signal outside the write threshold, and preventing the head from writing onto the media surface when it is in an incorrect position.

Algorithm 300 thereby configures the controller or data storage system running it to compensate for an indeterminate least significant bit in the Gray code value in a zone within plus or minus 25% of a track centerline. The end result for the value of the correction factor x is summarized in Table 1, below.

TABLE 1

| ZONE | Position Information | Generated X Value |
|---|---|---|
| 1 | Q < 0, N > 0, GC odd, N > −Q | +0.5 |
| 2 | Q < 0, N > 0, GC odd, N < −Q | +1 |
| 1 | Q < 0, N > 0, GC even, N > −Q | −0.5 |
| 2 | Q < 0, N > 0, GC even, N < −Q | +0 |
| 3 | Q < 0, N < 0, GC odd, N > Q | −1 |
| 4 | Q < 0, N < 0, GC odd, N < Q | −0.5 |
| 3 | Q < 0, N < 0, GC even, N > Q | +0 |
| 4 | Q < 0, N < 0, GC even, N < Q | +0.5 |
| 5 | Q > 0, N < 0, GC even, N < −Q | +0.5 |
| 6 | Q > 0, N < 0, GC even, N > −Q | +1 |
| 5 | Q > 0, N < 0, GC odd, N < −Q | −0.5 |
| 6 | Q > 0, N < 0, GC odd, N > −Q | +0 |
| 7 | Q > 0, N > 0, GC even, N < Q | −1 |
| 8 | Q > 0, N > 0, GC even, N > Q | −0.5 |
| 7 | Q > 0, N > 0, GC odd, N < Q | +0 |
| 8 | Q > 0, N > 0, GC odd, N > Q | +0.5 |

Algorithm 300 thereby configures the controller included in a data storage system to use position information received from a read head to evaluate a track offset position of the read head, and within that process, to compensate for any error that might occur in a Gray code value contained within the position information, and to generate a position error signal for the read head that includes any such compensation for an erroneous Gray code value. Algorithm 300 also thereby ensures that if an adjustment made in evaluating the track offset position is incorrect, a resulting position error signal will be larger than a validity threshold, i.e. the write fault threshold, corresponding to the position being obviously invalid, in which case an estimated value will be provided. The estimated value may be generated by additional algorithms or systems, such as those currently known to those in the art, or other systems, for example.

The present invention therefore includes unexpected and novel advantages as detailed herein and as can be further appreciated from the claims, figures, and description by those skilled in the art. Although some of the embodiments are described in reference to a controller and/or a data storage system, the present invention has various other embodiments with application to other devices, systems and applications in which position information is used to evaluate a position.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present invention, to the full extent indicated by the broad, general meaning of the terms in which the appended claims are expressed. It will be appreciated by those skilled in the art that the teachings of the present invention can be applied to a family of systems, devices, and means encompassed by and equivalent to the examples of embodiments described, without departing from the scope and spirit of the present invention. Further, still other applications for various embodiments, including embodiments pertaining to a variety of other servo burst values, data storage systems, and related technologies, are envisioned within the scope of the present invention as claimed herein.

What is claimed is:

1. A device comprising:
   circuitry configured to evaluate error in a Gray code value based on servo burst amplitudes; and
   circuitry configured to provide compensation for the evaluated error in the Gray code value.

2. The device of claim 1, further configured to receive the Gray code value and the servo burst amplitudes with position information from an element that is controllably positionable relative to a medium.

3. The device of claim 2, further comprising:
   the circuitry configured to evaluate the error in the Gray code value based on the servo burst amplitudes is further configured to evaluate error in the position information; and
   the circuitry configured to provide compensation for the error in the Gray code value is further configured to compensate for the error in the position information, as evaluated based on the Gray code value and the servo burst amplitudes, to position the element relative to the medium.

4. The device of claim 3, further configured to generate a signal for positioning the element relative to the medium, in which the signal comprises the compensation for error in the position information, comprising compensation for error in the Gray code value.

5. The device of claim 4, further configured to adjust the signal to be greater than a position error signal threshold, responsively to the error in the Gray code value.

6. The device of claim 4, further configured to adjust the signal responsively to the error in the Gray code value if a least significant bit comprised in the Gray code value is indeterminate in a zone within plus or minus 25% of a track centerline of the medium.

7. The device of claim 4, further configured to provide an estimated position error signal, if the adjusting of the signal causes the signal to be greater than a position error signal threshold.

8. The device of claim 3, further configured to evaluate a track offset position of the element relative to a Gray code transition on the medium.

9. The device of claim 3, further comprising evaluating values of servo burst components N and Q from among the servo burst amplitudes before evaluating the Gray code value.

10. The device of claim 9, further configured to evaluate the track offset position of the element by:
    first, evaluating whether the Q value is less than zero;
    second, evaluating whether the N value is greater than zero; and
    third, evaluating whether the Gray code value is even or odd.

11. The device of claim 10, further configured to evaluate the track offset position of the element by: fourth,
    if the Q value is less than zero and the N value is greater than zero, then evaluating whether the N value is greater than negative one times the Q value;
    if the Q value is less than zero and the N value is not greater than zero, then evaluating whether the N value is greater than the Q value;
    if the Q value is not less than zero and the N value is not greater than zero, then evaluating whether the N value is less than negative one times the Q value; and
    if the Q value is not less than zero and the N value is greater than zero, then evaluating whether the N value is less than the Q value.

12. A device comprising:
    circuitry configured to evaluate error in a Gray code value by comparing a Gray code value to a zone indicated from values of servo burst components; and
    circuitry configured to provide compensation for the evaluated error in the Gray code value.

13. The device of claim 12, wherein a least significant bit of the Gray code value is compared to values of servo burst components N and Q to evaluate the error.

14. A method comprising steps of:
    making a comparison, using a processor, of Gray code information with a zone indicated by servo burst information;
    evaluating, using a processor, error in the Gray code information based on the comparison; and
    using the evaluated error in the Gray code information to position an element.

15. The method of claim 14, further comprising the Gray code information and the servo burst information are received from the element.

16. The method of claim 14, further comprising steps of generating a position error signal as a function of the comparison, and using the position error signal in positioning the element relative to tracks on a data medium surface.

17. The method of claim 14, further comprising comparing whether the servo burst amplitudes are above or below zero and whether the Gray code value is even or odd.

18. A data storage system, comprising:
    a data storage medium;
    a head, controllably positionable relative to the data storage medium; and
    a controller, configured to sense position information comprising Gray code values and servo burst amplitudes from the head, to determine error in the position information by comparing the Gray code values to servo burst information, and to compensate for the error in the position information.

19. The data storage system of claim 18, further comprising the controller configured to prevent the head from writing to the data storage medium when the position information exceeds an error threshold.

20. The data storage system of claim 18, further comprising the controller configured to:
    evaluate whether a first servo burst component value of the position information is less than zero and a second servo burst component value comprised of the position information is greater than zero, and if so, then evaluating whether a Gray code value of the position information is even and whether the second servo burst component value is greater than negative one multiplied by the first servo burst component value;
    evaluating whether the first servo burst component value is less than zero and the second servo burst component value is not greater than zero, and if so, then evaluating whether the Gray code value is even and whether the second servo burst component value is greater than the first servo burst component value;
    evaluating whether the first servo burst component value is not less than zero and the second servo burst component value is not greater than zero, and if so, then evaluating whether the Gray code value is odd and whether the second servo burst component value is less than negative one multiplied by the first servo burst component value; and
    evaluating whether the first servo burst component value is not less than zero and the second servo burst component value is greater than zero, and if so, then evaluating whether the Gray code value is odd and whether the second servo burst component value is less than the first servo burst component value.

* * * * *